US006295357B1

(12) United States Patent
Staples et al.

(10) Patent No.: US 6,295,357 B1
(45) Date of Patent: Sep. 25, 2001

(54) SYSTEM AND METHOD FOR RINGING OTHER SUBSCRIBER TELEPHONES CONNECTED TO A TELEPHONE LINE DURING DATA COMMUNICATIONS ON THE TELEPHONE LINE

(75) Inventors: Leven E. Staples, Granbury; W. B. Barker, San Antonio, both of TX (US)

(73) Assignee: Data Race, Inc., San Antonio, TX (US)

( * ) Notice: Subject to any disclaimer, the term of this patent is extended or adjusted under 35 U.S.C. 154(b) by 0 days.

(21) Appl. No.: 08/888,406

(22) Filed: Jul. 7, 1997

Related U.S. Application Data

(63) Continuation-in-part of application No. 08/708,267, filed on Sep. 6, 1996.

(51) Int. Cl.$^7$ .............................. H04M 3/00; H04M 11/00
(52) U.S. Cl. ..................... 379/418; 379/373; 379/93.07
(58) Field of Search ..................... 379/418, 373, 379/93.05, 93.09, 93.07, 100.12, 100.15, 211, 419, 442, 167, 93.01, 93.11, 93.28, 399

(56) References Cited

U.S. PATENT DOCUMENTS

| 4,862,456 | * | 8/1989 | Giorgio ...................................... 375/8 |
| 5,140,630 | * | 8/1992 | Fry et al. .............................. 379/179 |

(List continued on next page.)

FOREIGN PATENT DOCUMENTS

| 0 367 455 A2 | 5/1990 | (EP) . |
| 0 536 949 A2 | 4/1993 | (EP) . |

OTHER PUBLICATIONS

*The ITU Telecommunication Standardization Sector (ITU–T)*, Draft V.DSVD–S (Draft of Dec. 8, 1995), Copyright 1996, 22 pages.

(List continued on next page.)

*Primary Examiner*—Wing F. Chan
(74) *Attorney, Agent, or Firm*—Conley, Rose & Tayon, PC; Robert C. Kowert

(57) ABSTRACT

A system and method for enabling a subscriber to receive incoming telephone calls on a telephone line and ring all of the telephones connected to a first conductor pair inside the subscriber's premises, wherein the first conductor pair would have normally been connected to the line. The telephones may be rung even when the subscriber is performing data communications with a remote data site on the telephone line. This obviates the necessity of the subscriber having to purchase a second telephone line for incoming calls while data communications are being performed, thus reducing access costs. The system and method shown advantageously employs a wiring device to reroute the telephone line from the first conductor pair connected to the phones to a second conductor pair normally not used. The system and method further employs a modem which receives telephone signals from the telephone line via the second conductor pair. The modem comprises a Central Office (CO) simulator circuit coupled to the first conductor pair which regenerates the telephone signals, such as a ringing voltage, to the telephones via the first conductor pair. When the modem is performing data communications with a remote data site, the remote data site also sends signals, such as data frames or IP packets, to the modem indicating that an incoming call has been placed to the telephone line. In response to the received signals, the modem controls the CO simulator to ring the extensions. The modem further comprises a relay which couples the first conductor pair to the second conductor pair when the modem is on hook with respect to the second conductor pair, thereby enabling normal speech communications to be performed by the subscriber on the telephone line. The relay couples the first conductor pair to the CO simulator when the modem is off hook with respect to the second conductor pair, thereby enabling the CO simulator to ring the telephones. In an alternate embodiment, the relay is comprised within an external wiring device coupled between the modem and conductor pairs and also includes a ring generator to alleviate the modem from having a ring generator for low power or real estate-constrained applications, such as in a notebook computer.

57 Claims, 7 Drawing Sheets

U.S. PATENT DOCUMENTS

| | | | | |
|---|---|---|---|---|
| 5,317,415 | * | 5/1994 | Kinami et al. | 358/425 |
| 5,448,635 | * | 9/1995 | Biehl et al. | 379/399 |
| 5,506,866 | * | 4/1996 | Bremer et al. | 375/216 |
| 5,598,536 | | 1/1997 | Slaught, III et al. | 709/219 |
| 5,602,846 | | 2/1997 | Homquist et al. | 370/384 |
| 5,636,218 | | 6/1997 | Ishikawa et al. | 370/401 |
| 5,805,587 | * | 9/1998 | Norris et al. | 370/352 |
| 5,818,819 | * | 10/1998 | Hallock et al. | 370/259 |
| 5,841,840 | | 11/1998 | Smith et al. . | |
| 5,850,436 | * | 12/1998 | Rosen et al. | 379/377 |
| 5,870,465 | * | 2/1999 | Hosbach et al. | 379/419 |
| 5,901,205 | * | 5/1999 | Smith et al. | 379/93.01 |
| 5,978,469 | * | 11/1999 | Benson | 379/377 |

OTHER PUBLICATIONS

*The ITU Telecommunication Standardization Sector (ITU–T)*, Draft V.75 (Draft of Feb. 2, 1996), pp. 1–23.

*Teltone OfficeLink,* Teltone advertising brochure (Pub. Jan. 10, 1995).

Patent Abstract of Japan, Publication No. 60030248, dated Feb. 15, 1985.

Dieter Hochreuter, Michael Nash, "Hicomn 300—eine Vielfalt neuer Möglichkeiten," Telcom Report (Siemens), vol. 18, No. 5, Oct. 1995, MÜnchen, DE, XP000543153, pp. 265–267.

International Search Report for PCT/US96/16455 dated Apr. 24, 1997.

* cited by examiner

SYSTEM AND METHOD FOR RINGING OTHER SUBSCRIBER TELEPHONES CONNECTED TO A TELEPHONE LINE DURING DATA COMMUNICATIONS ON THE TELEPHONE LINE

CONTINUATION DATA

This is a continuation-in-part of co-pending application Ser. No. 08/708,267 titled "System And Method for Providing User Connectivity to a Remote Data Site on a Communication Line While Maintaining Telephone Connectivity on the Communication Line" filed Sep. 6, 1996, whose inventor was W. B. Barker, and which was assigned to Data Race.

FIELD OF THE INVENTION

The present invention relates to simultaneous voice and data communications on a single telephone line, and in particular to the ability to ring all of the telephones connected to the telephone line to notify a subscriber of an incoming call even while data communications are being performed on the telephone line.

DESCRIPTION OF THE RELATED ART

In many instances a user desires to connect to a remote data site to obtain data or perform other communications data operations. For example, a user who desires access to the Internet typically connects to an Internet access provider in order for the user to be able to connect to the Internet. In addition, many people who desire to work at home, referred to as telecommuters, desire to connect to the local area network (LAN) at the corporate office in order to retreive files, obtain data or perform other data access communications functions.

When a home user desires to connect to a remote data site, the user data typically uses the standard POTS (plain old telephone service) telephone line in his home. Thus, the user uses an analog modem, such a V.34 modem, to connect through the POTS telephone line to the remote data site. However, when the telephone line is used for this purpose, and the user is connected through the POTS telephone line to the remote data site, the user is unable to receive telephone calls from other parties, since the telephone line is in use.

Many home users who connect to the Internet or to other remote data sites typically purchase a second phone line from the telephone company to enable the user to receive or place telephone calls while the user is connected to the remote data site. Thus, the user purchases a second telephone line and uses this telephone line to connect to an Internet service provider or other remote data site. This use of the second telephone line for data connectivity leaves the primary telephone line available for incoming or outgoing phone calls.

However, a second telephone line is somewhat expensive. For example, for a home user connecting to the Internet, the cost of the second telephone line is generally similar to the connection cost of the Internet service provider. Thus, the requirement of the second telephone line essentially doubles the Internet service fee the user is required to pay to obtain the Internet connection while maintaining the ability to receive incoming or place outgoing calls. In addition, when a user connects to another remote data site, such as a corporate office, the purchase of a second telephone line is an undesirable cost.

Co-pending U.S. application Ser. No. 08/708,267 titled "System And Method for Providing User Connectivity to a Remote Data Site on a Communication Line While Maintaining Telephone Connectivity on the Communication Line" filed Sep. 6, 1996 whose inventor is W. B. Barker, discloses a system and method which enables the user to connect to the remote data site on a communications line, wherein the user maintains the ability to receive or place telephone calls from/to other parties through the communications line while the user is connected to the remote data site on the communications line. In this system, incoming calls are received on the communication device or modem which is performing the data communications on the communications line. The incoming call is not received as a traditional ring signal from the telephone company central office (CO), but rather is received as a data packet from the remote data site. The data or information in the data packet indicates that a call is being received. The communication device then rings only the telephone connected to the communication device when an incoming call is received. The above-referenced patent application also discloses a system and method, which is the subject of the present application, wherein each of the telephones within the user's home rings to notify the user whenever another party places a telephone call through the communication line while the communication device is performing data communications on the communication line.

SUMMARY OF THE INVENTION

The present invention comprises a system and method for enabling a subscriber to receive incoming telephone calls on a telephone line and ring all extensions associated with the telephone line. The telephones may be rung even when the subscriber is performing data communications with a remote data site on the telephone line. Also, due to the data communications being performed, the incoming call information is received in a data packet, not as a traditional ring signal from the telephone company central office. The present invention is operable to receive the call information in the data packet and ring other extensions. This obviates the necessity of the subscriber having to purchase a second telephone line for incoming calls while data communications are being performed, thus reducing access costs.

The system comprises a telephone line for transferring telephone signals between a telephone network and a premises, and the system comprises first and second conductor pairs comprised within the premises for transferring telephone signals within the premises. The system further comprises a wiring device coupled between the telephone line and the conductor pairs, wherein the wiring device connects the telephone line to the second conductor pair. One or more telephone instruments are coupled to the first conductor pair, i.e., the normal wiring typically found in premises today. The system further comprises a communication device or modem coupled to both the first and second conductor pairs and coupled to the telephone line through the second conductor pair and wiring device.

The invention is operable to ring all of the telephones connected to the first conductor pair inside the subscriber's premises. The first conductor pair would have normally been connected to the external telephone line. The system and method advantageously employs the wiring device to reroute the telephone line to the second conductor pair in the home instead of the first conductor pair to which the phones are connected. The second conductor pair is normally not used within a house with a single purchased telephone line, and is normally used to connect to a second purchased telephone line. The system and method further employs a modem which receives signals indicating an incoming telephone call from the telephone line via the second conductor pair and causes ring signals to be generated to the telephones connected to the first conductor pair in response to the signals indicating an incoming call. Preferably, the signals indicating an incoming call comprise one or more data packets.

The modem includes a Central Office (CO) simulator circuit, which includes a ring generator, coupled to the first conductor pair which regenerates the telephone signals, such as a ringing voltage, to the telephones connected to the first conductor pair. In other words, the modem includes a ring generator coupled to the first conductor pair for ringing the telephones which are coupled to the first conductor pair. The modem further comprises a line interface circuit coupled to the second conductor pair. The line interface circuit comprises a switch coupled between the conductors of the second conductor pair and the modem. The switch closes, i.e., goes off hook, in order to complete a circuit with a CO at the far end of the telephone line. The switch closes to enable the modem to answer or place a call on the telephone line.

The modem further comprises communications circuitry, such as a data pump and a codec, for performing data communications with the telephone network on the telephone line. Preferably, the modem is coupled to a computer, wherein the modem is operable to perform data communications between the computer and the telephone network. The modem further comprises a controller, such as a microcontroller or a task of the attached computer, operably coupled to the line interface and the communication circuitry. The controller is operable to control the ring generator to ring the one or more telephone instruments in response to signals indicating an incoming call received from the second conductor pair transferred on the telephone line which indicate an incoming call. The control circuitry is operable to control the ring generator to ring the one or more telephone instruments in response to the signals indicating an incoming call received from the second conductor pair through the telephone line while the modem is performing data communications with the telephone network. During data communications, the remote data site may transmit a data packet or signals which indicates an incoming call.

The modem is also operable to perform voice communications between the one or more telephone instruments and the telephone network on the telephone line while simultaneously performing the data communications with the telephone network.

The system further comprises a relay for selectively coupling the first conductor pair to either the second conductor pair or to the ring generator. The relay couples the first conductor pair to the second conductor pair when the switch is open, i.e., on hook, thereby enabling normal voice communications using the telephones as if the wiring device and modem were not present. The relay couples the first conductor pair to the ring generator when the switch is closed. Thereby, the modem is enabled to perform simultaneous voice and data communications on the telephone line, and the ring generator is thereby enabled to ring the telephones via the first conductor pair.

In one embodiment, the relay is comprised within the modem. In another embodiment, the relay is comprised within a second wiring device coupled between the modem and the first and second conductor pairs. In the second wiring device embodiment, the ringing circuit may be comprised within the second wiring device rather than within the modem, or the second wiring device may comprise a ring booster circuit to assist in ringing the telephones. If the ringing circuit is comprised within the second wiring device, the computer provides a notification to the computer user that a call is incoming, since there is no ringing circuit in the modem to ring a telephone coupled directly to the modem. Preferably, the computer displays an indication on its display screen of the incoming call and/or beeps or synthesizes the sound of a ringing phone. This embodiment is particularly advantageous for power constrained or space constrained applications such as notebook computers. In an alternate embodiment, the computer receives the data packet, such as an IP packet, indicating the incoming phone call and controls the ring generator to ring the telephones in response to the packet, rather than the modem controlling the ring generator.

BRIEF DESCRIPTION OF THE DRAWINGS

A better understanding of the present invention can be obtained when the following detailed description of the preferred embodiment is considered in conjunction with the following drawings, in which.

Figure 1:
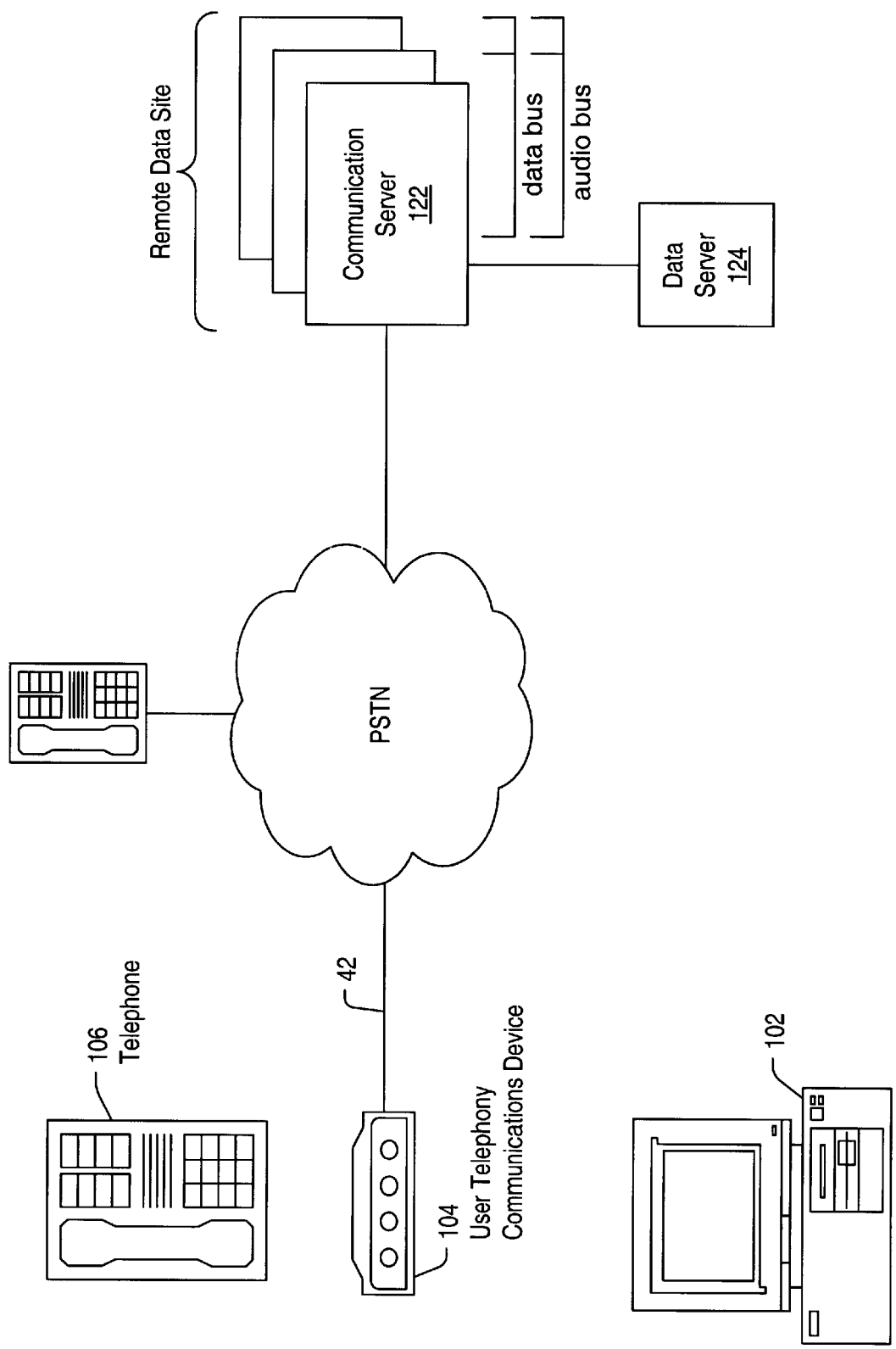
FIG. 1 illustrates a system wherein a user connects to a remote data site on a communication line, such as a telephone line, while maintaining telephone connectivity on the communication line according to the present invention.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But, on the contrary, the invention is to cover all modifications, equivalents and alternative following within the spirit and scope of the present invention as defined by the appended claims.

DETAILED DESCRIPTION OF THE SPECIFIC EMBODIMENTS

Incorporation by Reference

U.S. patent application Ser. No. 08/708,267 titled "System And Method for Providing User Connectivity to a Remote Data Site on a Communication Line While Maintaining Telephone Connectivity on the Communication Line" filed Sep. 6, 1996, whose inventor was W. B. Barker, and which was assigned to Data Race, is hereby incorporated by reference in its entirety as though fully and completely set forth herein.

FIG. 1—System of the Present Invention

FIG. 1 illustrates a system which provides a user operating a user telephony communications device with connectivity to a remote data site over a communication line or telephone line. In the system of FIG. 1, the user maintains telephone connectivity with other parties through this communication line or telephone line while the user is connected to the remote data site on the communication line. In other words, the user can receive or place telephone calls made to the telephone number assigned to the communication line or telephone line while the user telephony communications device 104 is connected to the remote data site over the communication line or telephone line. Furthermore, all of the extensions associated with the telephone line may be caused to ring in response to the received telephone calls made to the telephone number assigned to the telephone line while the user telephony communications device 104 is connected to the remote data site over the telephone line.

As shown, the system of FIG. 1 illustrates a remote user including a user telephony communication device, or modem, 104 configured to connect to a remote data site through the public switched telephone network (PSTN). The remote user may be a home user, i.e., a user operating at his home. For example, the user may be a person at home desiring to connect through an Internet service provider to the Internet. The user may also be a telecommuter working at home desiring to connect to a local area network (LAN) at a corporate office or another data site. In general, the user is a person who desires to connect to a remote data site through a communication line or telephone line and who desires to be able to receive and/or place calls on that communication line or telephone line without having to purchase a second phone line from the telephone company.

The remote data site correspondingly may be an Internet service provider, a corporate LAN, a telephone company central office, or any other location where data is stored or through which data may be accessed.

As shown, the remote user will generally operate a computer system 102. The computer system 102 may be any type of data access device, including a general purpose computer, a personal digital assistant (PDA), a network computer, or television or other viewing device configured as an Internet access device or information access device.

The computer system 102 connects through a user telephony communication device 104 to the public switched telephone network (PSTN). The present invention may be used in any of various embodiments where voice calls are transferred with data on a connection, such as an internet connection.

In one embodiment of FIG. 1, the user telephony communication device 104 comprises a modem 104 which connects to the PSTN. The modem 104 preferably supports both voice and data capabilities. For example, in one embodiment the modem 104 is a digital simultaneous voice and data (DSVD) modem. However, in other embodiments, the user telephony communication device 104 comprises a standard modem, ATM card, or other user telephony communications device 104 for connecting to the PSTN. The user telephony communication device 104 may be external to the computer system 102, or may be comprised in the computer system 102. As discussed further below, in this embodiment either the user telephony communication device 104 or the remote data site is configured to perform intelligent call forwarding operations to enable the user to be able to receive telephone calls on a telephone line 42 while performing data access operations using the telephone line 42.

The remote user location also includes a telephone 106, which provides standard POTS or ISDN service. The telephone 106 may connect directly to the PSTN or may connect through the user telephony communication device 104 to the PSTN. The user telephony communication device 104 may also be comprised in the telephone 106. The remote user location also includes one or more telephones, i.e., extensions.

In the preferred embodiment, the user telephony communication device 104 comprises communication logic for sending/receiving voice and/or data. The user telephony communications device 104 can also be broadly defined as comprising one or more of the communication device 104, the telephone 106, and/or the computer system 102 configured to operate as a telephony communications device.

The user telephony communication device 104 connects to the PSTN through a communications line or communications media 42. In the preferred embodiment, the communications line 42 is a standard POTS telephone line. The communication line 42 may be a POTS telephone line, or other type of communication line.

The communication line or telephone line 42 has an associated telephone number, i.e., the communication line or telephone line 42 has been assigned a telephone number by the telephone company central office within the PSTN. Thus, when other parties desire to call the user of the user telephony communications device 104, the other parties dial this number. As is well known in the art, when other parties dial this number, the central office determines if the telephone line 42 is available, i.e., not busy. If the line 42 is not busy, a ring generator in the central office generates ringing voltages on the telephone line 42. Any telephony devices connected to the telephone line 42 ring in response to the ringing voltage. However, the present invention employs a separate ring generator to generate the ringing voltage to ring the telephones at the remote user location.

The remote user connects through the user telephony communication device or modem 104, through the PSTN to a remote data site. The remote data site includes one or more communication servers 122, also referred to as remote data site servers 122 or voice gateways 122. The one or more communication servers 122 perform intelligent call routing functions, as discussed below. The one or more communication servers 122 are configured to connect to the PSTN. Thus when the user telephony communication device 104 connects through the PSTN to the remote data site, the user telephony communication device 104 connects to one of the one or more communication servers 122 at the remote data site. The one or more communication servers 122 are preferably coupled together by a data bus and an audio bus. The audio bus is configured to carry speech and/or voice data.

The one or more communication servers 122 connect to one or more data servers or data storage devices 124. For example, where the remote data site is an Internet service provider, the one or more communication servers 122 connect to the Internet. Thus, when the user connects to the Internet, the user telephony communication device 104 connects through the PSTN and through the one or more communication servers 122 to the Internet. If the remote data site is a corporate LAN, the one or more communication servers 122 connect to the corporate LAN, i.e., connect to one or more data servers or file servers on the corporate LAN.

The system and method of the present invention is intended to be used in systems in which a remote user is allowed to connect through a single telephone line 42 through the PSTN to a remote data site, while enabling the user to be able to receive telephone calls from external parties on this same telephone line 42, thereby obviating the necessity for the remote user having to purchase a second phone line to receive telephone calls while the user is performing remote data access services, such as Internet access or access to the corporate LAN. Examples of such systems are the BeThere! system of DataRace Corporation and any ISP-related adaptations of BeThere!, and the Phone Doubler system of Ericsson. The system and method of the present invention may be used with systems such as BeThere! or Phone Doubler to advantageously ring the other extensions in the user location to notify the user of incoming telephone calls.

During operation of the system, the user telephony communications device 104 dials an access number of the remote data site and establishes a data connection with the remote data site, such as a V.42 connection, or Internet Protocol (IP) connection, in order to perform data communications with the remote data site. An example of such data communications is the subscriber "surfing the net." A call forwarding operation is performed, preferably by either the user telephony communication device 104 or a communication server 122 at the remote data site. The call-forwarding operation is performed prior to or during the data connection in order to call-forward telephone calls that would normally be received at the user's or subscriber's home, wherein the call forwarding operation routes or forwards these calls to the remote data site. The call forwarding operation operates to forward calls that would normally be received at the subscriber's home to one of a plurality of direct inward dial (DID) voice lines which are received at the remote data site from the PSTN. The call forwarding operation may comprise a standard call forwarding operation, such as using "72#", or the operation may comprise use of other telephony features such as call diversion to another number in the case of a busy line.

When another party makes a call to the telephone number to attempt to call the user or subscriber at home, the call is call forwarded to the remote data site. When the remote data site receives the forwarded voice telephone call on a Direct-Inward-Dial (DID) line of the remote data site, the communications server 122 at the remote data site operates to route this call through a respective inbound dial-up data line, which the user is currently using, through the PSTN, through the user's single telephone line, to the user telephony communication device 104 of the user to which the call is originally placed.

Preferably, the communications server 122 at the remote data site comprises one or more modems capable of performing simultaneous voice and data communications with the subscriber's telephony communications device 104. Preferably, the communication server 122 instructs its modem to transmit one or more data frames, or data packets, to the subscriber's telephony communications device 104 over the telephone line 42 to notify the telephony communications device 104 of the routed call. Preferably, the data packets comprise information indicating a telephone call is being placed to the telephone line 42. The subscriber's modem 104 receives the packet and provides an indication to the subscriber that a call has been received. In one embodiment, the indication comprises the modem 104 ringing the telephone 106. Examples of the indication are the computer 102 providing the indication, such as a beep, a visually detectable display on the computer's screen, or a sound generated by the computer 102 simulating a telephone ringing. Thus, the subscriber can receive voice telephone calls on the single telephone line while also performing data communications using this single telephone line.

FIG. 2

Figure 2:
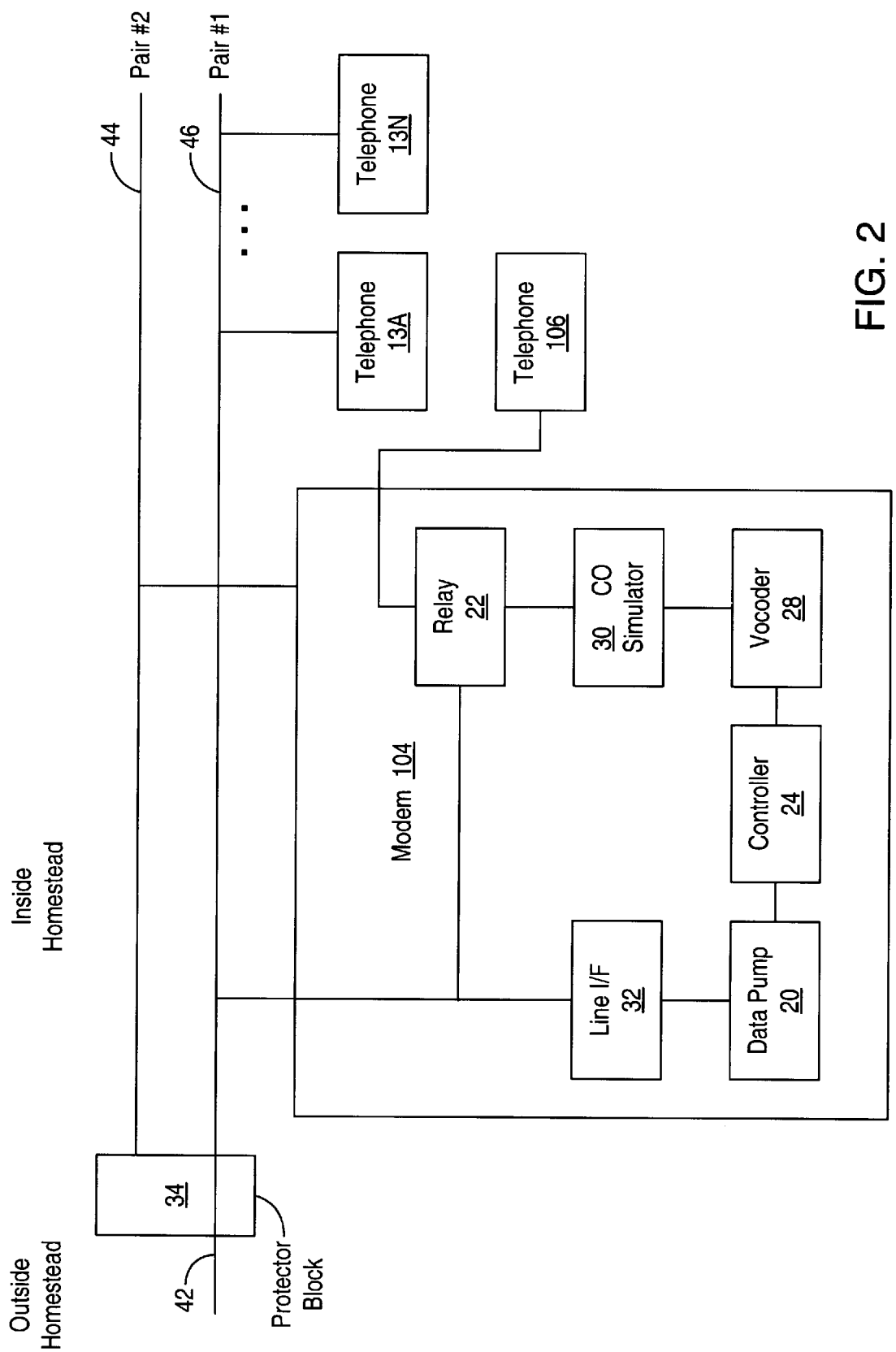
FIG. 2 is a block diagram of a telecommunications system including a modem 104 of FIG. 1 which does not embody the present invention, but which serves to illustrate advantages of the present invention.

Referring now to FIG. 2, a block diagram is shown of a telecommunications system including a modem 104 which does not embody the present invention. This diagram serves to illustrate advantages of the present invention. The telecommunications system comprises a telephone line 42 coming from the PSTN into the protector block 34 of a home or other premises. The system further comprises first and second conductor pairs 46 and 44, respectively. The first and second conductor pairs 46 and 44 transfer telephone signals within the house. The first conductor pair 46 is connected to the telephone line 42. Typically, the first and second conductor pairs 46 and 44 are comprised within a single cable having a connector which plugs into a jack in the protector block. The cable connector and jack are configured to connect the telephone line and conductor pairs as described.

One or more telephone instruments, 13A through 13N (referred to collectively as 13), are coupled to the first conductor pair 46. Since the first conductor pair 46 is coupled to the telephone line 42, the telephones 13 are also coupled to the telephone line 42. The telephones 13 are rung by a ringing signal generated by a ring generator provided within a Central Office (CO) of the PSTN at the far end of the telephone line 42.

A line interface 32 of the modem 104 comprises a switch which closes (goes off hook) to place a call to the remote data site. The modem 104 places the call to the remote data site and establishes a data connection with the remote data site in order to perform data communications with the remote data site. When the switch closes, a circuit is completed with the CO at the far end of the telephone line 42. In the closed circuit condition, the CO can not generate a ring signal on the telephone line 42 to place a call on the telephone line 42. In other words, the CO can not place a call on the telephone line 42 since the telephone line 42 is "busy", i.e., off hook, when the modem 104 and remote data site are in data communication.

As previously described, when a third subscriber places a call to the telephone line phone number, the call is forwarded to the remote data site. When the remote data site wants to route the call to the telephone line number, the remote data site must notify the modem 104 by some other means than having the CO at the far end of the telephone line 42 generate a ringing voltage on the telephone line 42, since the telephone line 42 is busy. Thus, as previously described, the modem in the communication server 122 preferably transmits a data packet to the modem 104 which includes an indication of an incoming call. The data packet may include, for example, an Internet Protocol (IP) data packet, or a data frame, such as a V.42 protocol data frame.

Control circuitry in the modem 104, such as the controller 24, receives the data packet and acts to provide the subscriber with an indication of the incoming call. In one embodiment, the controller 24 controls a ring generator in a CO simulator circuit 30 to ring a second telephone 106 coupled to the ring generator in the CO simulator 30. In another embodiment, the controller 24 provides an indication of the incoming call to the computer 102. In response, the computer 102 provides an indication to the user such as beeping the speaker of the computer 102, displaying a visual indication of the incoming call on the display screen of the computer 102, or simulating the sound of a telephone ringing, for example.

However, as may be readily observed, the modem 104 has no means to ring the other telephone 13 extensions in the house. This may be problematic if the subscriber is not in sufficient proximity to the computer 102 and/or telephone 106 to receive the indication of the incoming phone call. Thus, a system and method is desired which enables each of the other telephones 13 coupled to the first conductor pair 46 to ring. Such a system and method will be described below with reference to FIGS. 3 through 6.

FIGS. 3 through 6—Telephone Wiring Embodiments to Ring Other Extensions

Figure 3:
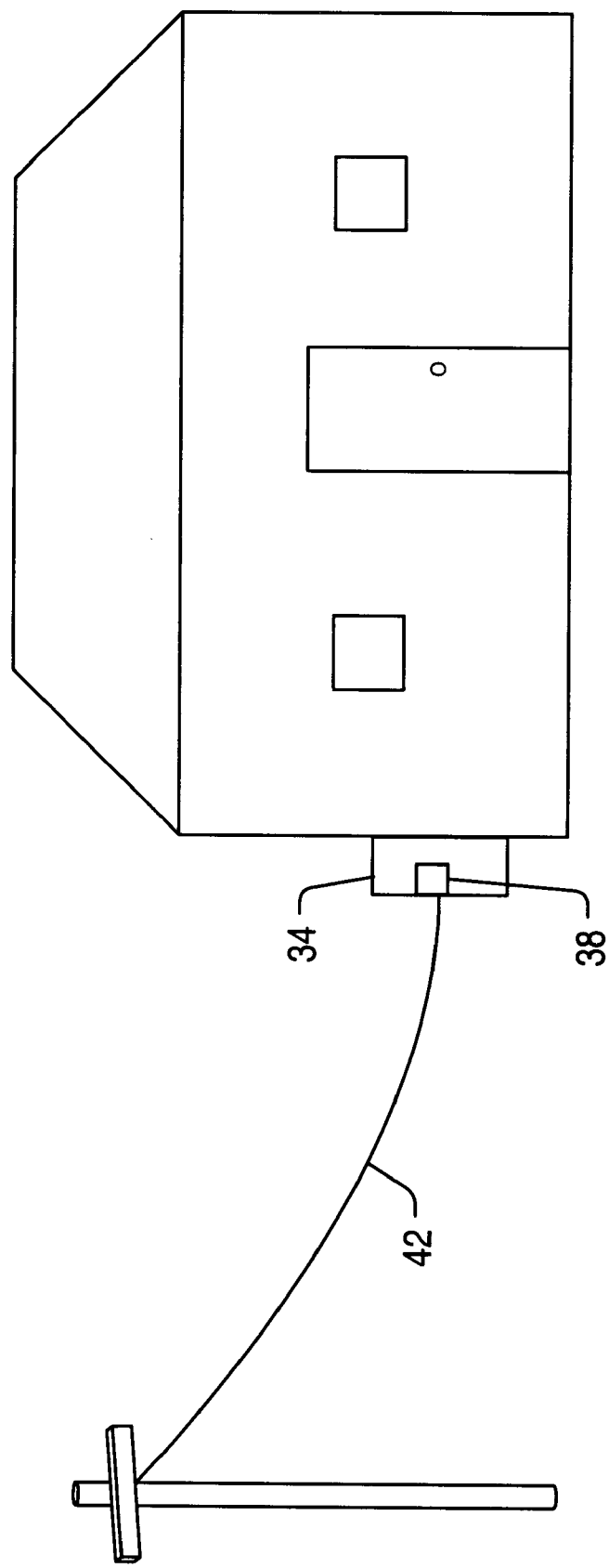
FIG. 3 illustrates a home which couples to a standard POTS telephone line.

Referring now to FIG. 3, an illustration of a home which is coupled to a standard POTS telephone line 42 is shown. The telephone line 42 comes from the PSTN to a protector block 34 on the outside of the home or premises. Typically, homes wired prior to 1990 receive Station-D house wiring comprising two wire pairs. The first wire pair is a red/green wire pair. The second pair is a yellow/black wire pair. In homes which only subscribe to one telephone line, the yellow/black pair is unused. Typically, homes wired subsequent to 1990 receive twisted pair cable comprising two, three or four wire pairs. The first pair is a blue/white and white/blue wire pair. The second pair is an orange/white and white/orange wire pair.

As mentioned above, the present invention includes a novel system and method for rewiring the home so that other telephone instruments ring when a telephone call is routed from the remote data site to the home user on the single telephone line. In this embodiment, the modem 104 of FIG. 1 operates to regenerate the telephony signals, such as a ringing signal, for the telephones in the house. The present invention employs a wiring device 38, preferably coupled to the protector block 34, for advantageously wiring the telephone line 42 to a second conductor pair within the home.

Figure 4:
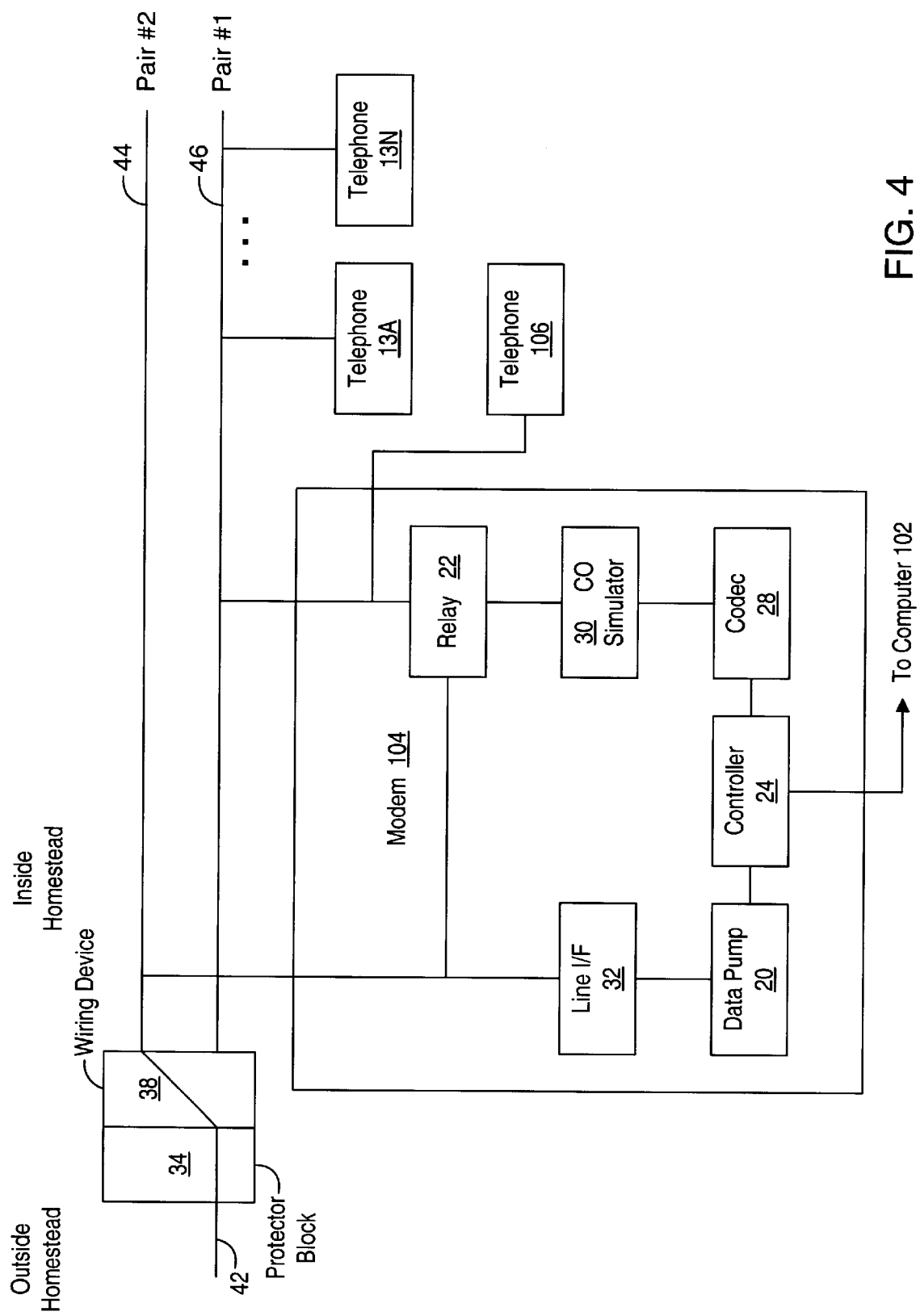
FIG. 4 is a block diagram of a telecommunications system according to one embodiment of the present invention.

Referring now to FIG. 4, a block diagram is shown of a telecommunications system including the wiring device 38 of FIG. 3 and the modem 104 of FIG. 1 according to one embodiment of the present invention. The telecommunications system comprises a telephone line 42 coming from the PSTN into the protector block 34 of a home or other premises. The system further comprises first and second conductor pairs 46 and 44, respectively. The first and second conductor pairs 46 and 44 transfer telephone signals within the house. Under normal operating conditions, i.e., when the wiring device 38 of the present invention is not employed, the first conductor pair 46 is connected to the telephone line 42, as shown in FIG. 2. Typically, the first and second conductor pairs 46 and 44 are comprised within a single cable having a connector which plugs into a jack in the protector block. The cable connector and jack are configured to connect the telephone line and conductor pairs as described.

According to the present invention, the wiring device 38 is coupled between the two conductor pair cable connector and the protector block jack. Preferably, the wiring device 8 couples the telephone line 42 to the second conductor pair 44 as shown.

Figure 5:
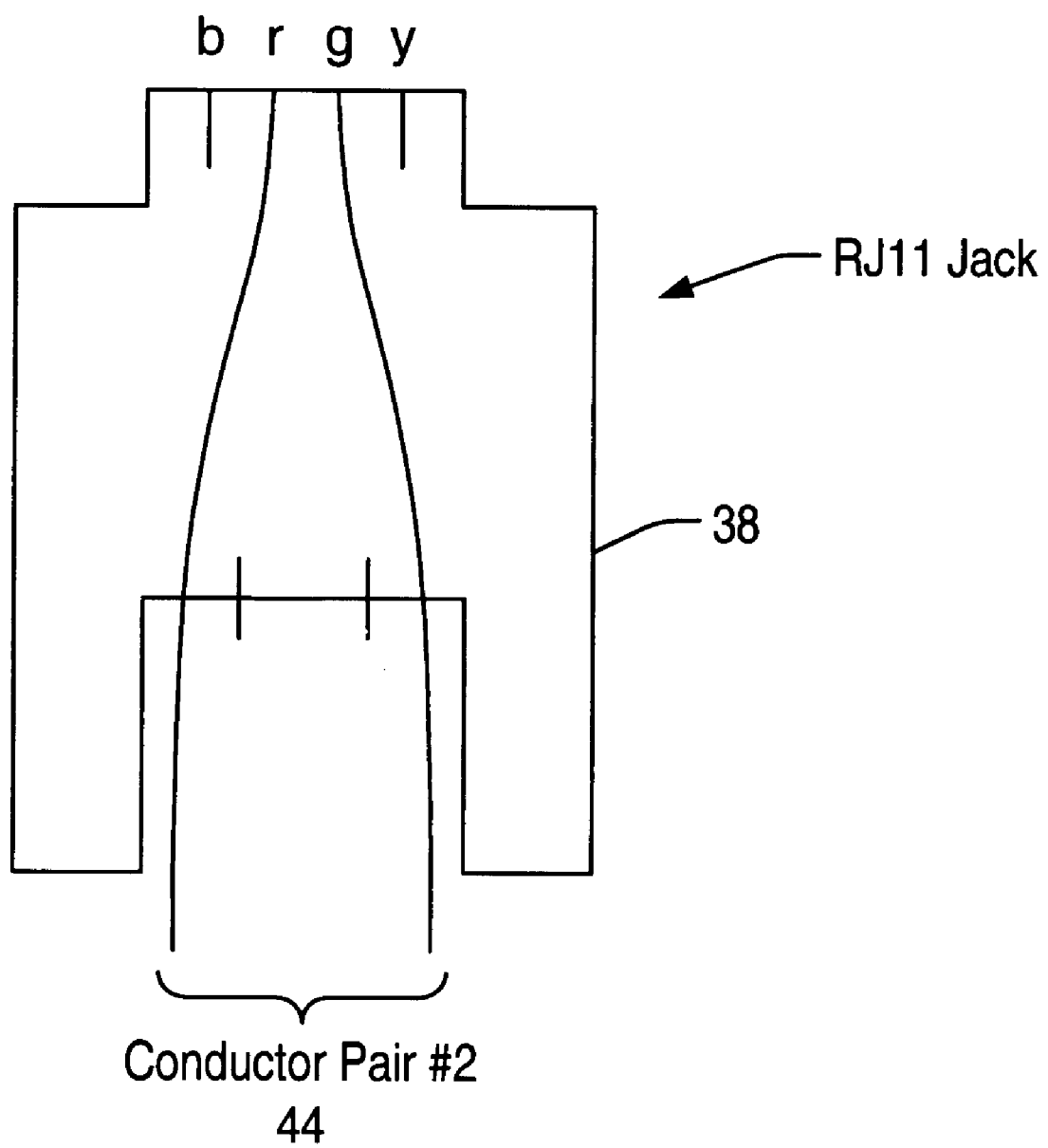
FIG. 5 illustrates the wiring device of FIG. 4 configured according to one embodiment of the present invention.

Referring briefly to FIG. 5, one embodiment of the wiring device 38 is shown. The wiring device 38 comprises a device, comprising a male and female modular telephone connector. Preferably, the male connector couples to the protector block 34 and the female connector couples to a cable housing the conductor pairs 46 and 44 wired inside the house. FIG. 5 illustrates the wiring device 38 connecting the incoming red/green pair of wires of the telephone line 42 to the second (yellow-black) conductor pair 44 inside the house.

Thus, the wiring device 38 switches the telephone line 42 from being connected to the first conductor pair 46, as it normally would be, to being connected to the second conductor pair 44. An embodiment is contemplated in which separate wiring devices may be placed at each of the telephone jacks within the premises for switching the first and second conductor pairs. However, the wiring device 38 advantageously requires only a single wiring device to perform the switching.

Referring again to FIG. 4, one or more telephone instruments, or handsets, 13A through 13N (referred to collectively as 13), are coupled to the first conductor pair 46. As previously discussed, in the absence of the wiring device 38, the telephone line 42 is normally coupled to the first conductor pair 46. Thus, the telephones 13 would normally be coupled to the telephone line 42 via the first conductor pair 46 through the protector block 34. As a result, the telephones 13 would be rung by a ringing signal generated by a ring generator provided within a Central Office (CO) of the PSTN. However, with the employment of the wiring device 38, the telephones 13 are now decoupled from the CO.

The modem 104 is coupled to the first and second conductor pairs 46 and 44. Preferably, the modem is also coupled to the computer 102 of FIG. 1. The modem 104 performs data communications between the computer 102 and the communications server 122 of FIG. 1 on the telephone line 42 as described previously. A telephone instrument 106 of FIG. 1 is coupled to the modem 104. The modem 104 also performs voice communications on the telephone line 42 between a subscriber speaking on the telephone instrument 106 and a second subscriber coupled to the communications server 122 as described previously.

The modem 104 comprises a line interface circuit 32 coupled to the second conductor pair 44. Preferably, the line interface 32 comprises various circuits commonly used in telephony devices such as a "hook" switch, surge suppression circuits, impedance matching circuits, a ringing voltage detector circuit, and telephony interface transformer. When the computer 102 desires to connect to the remote data site, the switch in the line interface 32 closes (goes off hook) to create a closed circuit with the CO at the other end of the telephone line 42 for the purpose of making a telephone call. When the switch closes (hook goes off hook), the line interface 32 draws current on the second conductor pair 44, as will be discussed below. A full-duplex analog signal passes through the line interface 32 between the telephone line 42 and a data pump 20 coupled to the line interface 32.

Data pumps are well known in the art of modem design. In one embodiment, the data pump 20 is a Lucent Technologies M-1634. The data pump performs the functions, among others, of modulating digital data for transmission as an analog signal on the second conductor pair 44 and demodulating modulated data received from the second conductor pair 44 into digital data. Preferably, the data pump 20 comprises an interface for transferring data frames, or data packets, between an interface comprised in a controller 24.

The controller 24 performs various control functions of the modem 104. Preferably, the modem 104 is a Digital Simultaneous Voice-Data (DSVD) modem, and the controller 24 demultiplexes simultaneously transmitted, i.e., multiplexed, speech and data frames received from a far end DSVD modem comprised in the communications server 122. The controller 24 is operable to receive compressed speech frames, i.e., voice encoded speech, from the data pump 20 and provide the data frames to a codec 28 coupled to the controller 24. The controller 24 is also operable to receive compressed speech frames from the codec 28 and provide the compressed speech frames to the data pump 20. Preferably, the controller 24 is also operably coupled to the computer 102. In one embodiment, the controller 24 is coupled to the computer 102 by an expansion bus, such as an Industry Standard Architecture (ISA) or Peripheral Component Interconnect (PCI) bus, through bus interface circuitry. The controller 24 receives data from and sends data to the computer 102 for exchange with the communications server 122.

In particular, the controller 24 is operable to execute instructions to control the codec 28 and data pump 20 to provide the user a means to receive telephone calls on the telephone line 42 while performing data transfers with the communications server 122 on the telephone line 42. The controller 24 comprises any processor device which is capable of executing a stored program of instructions including a task within computer 102. Preferably, the controller 24 comprises a processor, such as a microprocessor core and peripheral devices, such as the asynchronous serial interface. In one embodiment, the controller 24 is a Zilog Z80182 microcontroller.

Preferably, the stored program instructions which the controller 24 executes are comprised within a memory (not shown), such as a read-only memory (ROM), programmable ROM (PROM), erasable PROM (EPROM), FLASH memory, dynamic random access memory (DRAM), static random access memory (SRAM), among others, or a combination thereof. The memory is used to store programs instructions and data executed by the controller 24. The memory comprises frame buffers used to buffer frames received from the data pump 20 before being provided to the codec 28, and to buffer frames received from the codec 28 before being provided to the data pump 20. Preferably, the asynchronous serial port on the controller 24 receives bytes or blocks of data, and the controller 24 places the bytes or blocks of data into one of the frame buffers until an entire frame has been placed into the buffer. The memory may be comprised within or without the controller 24.

Codecs, such as codec 28, are well known in the art of voice encoded speech. Preferably, the codec 28 comprises an AT&T 1635. The codec 28 performs, among others, encoding of speech received from the telephone 106 and providing the compressed speech frames to the controller 24. The codec 28 further receives compressed speech frames from the controller 24 and decodes the compressed speech frames back into analog voice signals which are provided to the telephone 106 for reproduction to the subscriber.

In one embodiment, a compressed speech frame comprises 39 characters, or bytes. Of the 39 bytes, 32 of the bytes comprise voice encoded speech, 5 of the bytes comprise standard protocol control bytes, such as v.42 protocol bytes, and 2 bytes comprise voice frame specific control bytes. Preferably, the standard protocol bytes comprise error checking and/or error correction bytes, such as cyclic redundancy code (CRC) bytes. The voice encoded speech bytes comprise parameters which specify an encoded representation of the speech received by the codec 28 from the telephones 106 and 13 or received from the remote data site via the telephone line 42.

As discussed previously, the communications server 122 sends one or more data frames to the modem 104 to notify the modem 104 of an telephone call placed to the telephone line 42 telephone number. Preferably, the data frame conforms to the compressed speech frame format just described. Preferably, a code indicating the incoming telephone call is placed by the communication server 122 in one or both of the 2 voice frame specific control bytes or is placed in one or more of the 5 standard protocol control bytes.

The codec 28 is coupled to a Central Office (CO) simulator circuit 30. The CO simulator 30, also referred to as a telephone instrument interface circuit herein, simulates a portion of the operations of the CO of the PSTN. This is necessary since the employment of the wiring device 38 causes the telephones 106 and 13 to no longer be coupled to the CO. In particular, the CO simulator 30 comprises circuitry for detecting on hook and off hook conditions generated by telephone 106 and/or telephones 13. The CO simulator 30 communicates the detection of on and off hook conditions to the controller 24. Preferably, the CO simulator 30 comprises a ring generator for ringing the telephones 13 and 106.

A relay 22 is coupled to the CO simulator 30, the first conductor pair 46, and the second conductor pair 44 as shown. When the switch in the line interface 32 is open, i.e., the modem 104 is not in use, the relay 22 connects the first conductor pair 46 to the second conductor pair 44. Thus in an on-hook condition, the telephones 106 and 13 are connected to the telephone line 42, through the first and second conductor pairs 46 and 44, to operate as they would in the absence of the wiring device 38 and modem 104. In particular, when the CO generates a ringing voltage on the telephone line 42, the ringing voltage reaches the telephones 106 and 13 to ring their ringers. Likewise, when the telephones 106 and 13 generate off-hook or on-hook conditions, i.e., open or closed circuits, the conditions are sensed by the CO at the far end of the telephone line 42. Furthermore, voice signals travel through the first conductor pair 46, through the relay 22, through the second conductor pair 44, through the wiring device 38, and through the telephone line 42 between the CO and telephones 106 and 13. It is noted that this function of the relay 22 is advantageous in the event of a loss of power to the modem 104, whereby the telephones 13 are operable to function as they would in the absence of the wiring device 38 and modem 104.

When the switch in the line interface 32 is closed, i.e., the modem 104 is in use, the relay 22 connects the first conductor pair 46 to the CO simulator 30, rather than the second conductor pair 44. When the CO simulator 30 is connected to the telephones 106 and 13, the ring generator in the CO simulator 30 is capable of ringing the telephones 13 and 106. The ring generator is controlled by the controller 24 to ring the telephones 13 and 106 at the appropriate time. In particular, when the controller 24 detects signals indicating that a call is coming in on the telephone line 42, such as a data packet indicating an incoming call, the controller 24 instructs the CO simulator ringing circuit to generate a ringing signal, i.e., a ringing voltage. Preferably, when the controller 24 is performing data communications with the communications server 122, the communications server 122 transmits a data packet to the modem 104 which includes command codes indicating a ring signal, as previously discussed. That is, the communications server 122 attempts to place a call to the modem 104 to perform voice communications by sending a data frame including the appropriate command code understood by the modem 104 to be a ring signal. The relay 22 advantageously prevents the CO simulator 30 from being coupled to the actual CO in the PSTN.

Figure 6:
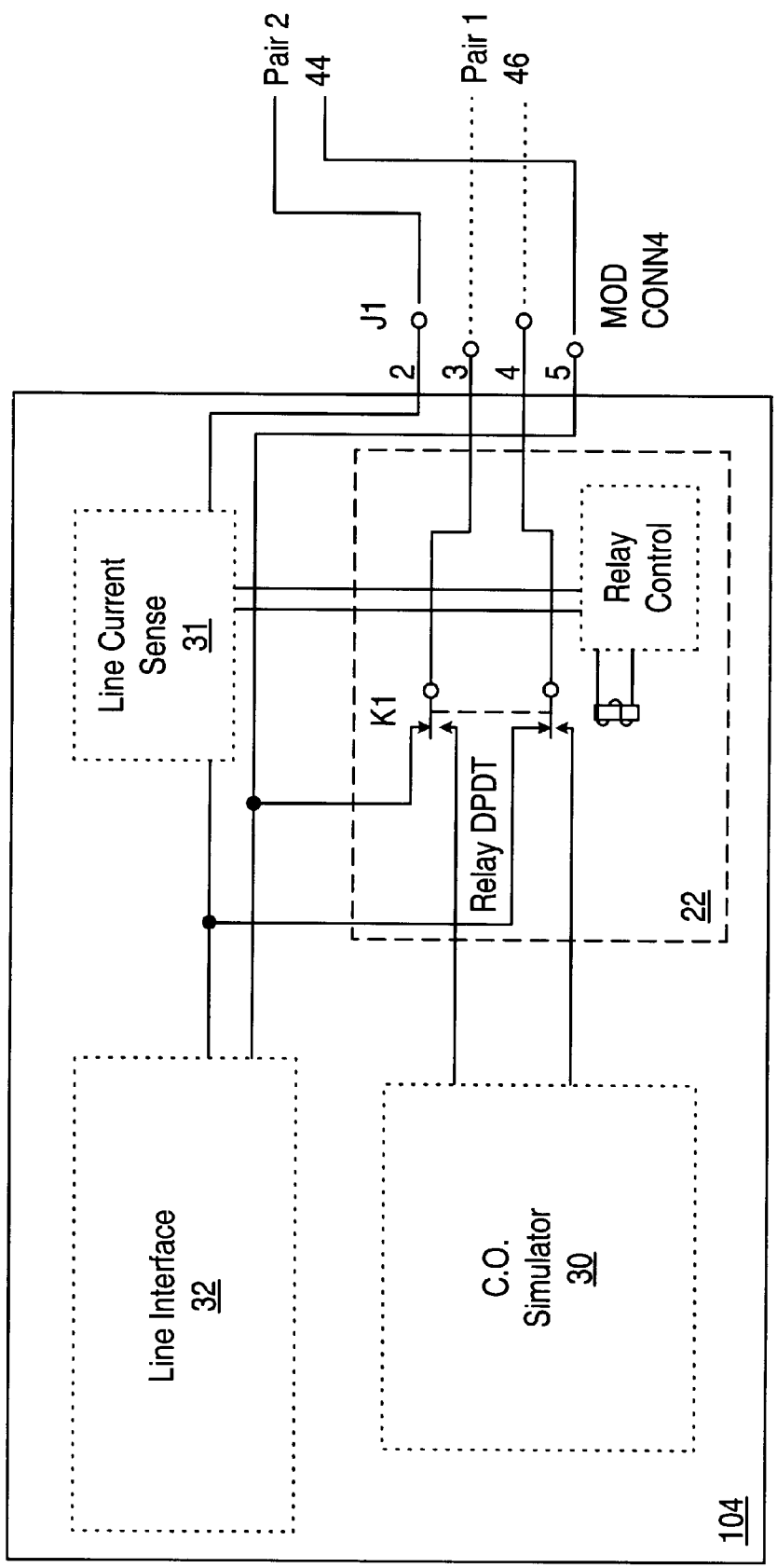
FIG. 6 illustrates in more detail the relay of FIG. 4.

In one embodiment, the relay 22 comprises a double pole double throw relay as shown in FIG. 6. The relay 22 may comprise electromechanical, electrical, or preferably, optoelectronic relay devices. Preferably, the relay 22 is controlled by a line current sensing circuit 31. The circuit 31 senses current draw by the line interface 32 on the second conductor pair 44. When current draw is sensed, the relay 22 connects the first conductor pair 46 to the CO simulator 30, and thus to the telephones 13 and 106. However, when current draw is not sensed, the relay 22 connects the first conductor pair 46 to the second conductor pair 44, thereby connecting the telephones 106 and 13 to the telephone line 42. FIG. 6 also shows a modular connector used to connect the first and second conductor pairs 46 and 44 to the modem 104.

Although the relay 22 and relay control circuit 31 are shown to be comprised within the modem 104 in FIG. 4, it is noted that the relay 22 and relay control circuit 31 may be comprised outside of the modem 104. In one embodiment, the relay 22 and relay control circuit 31 are comprised within a second wiring device, which is coupled between the modem 104 and the first and second conductor pairs 46 and 44.

Preferably, the second wiring device further comprises a ring generator or ring booster circuit for ringing the telephones 13. The relay 22 is coupled between the first conductor pair 46 and the ring generator. This embodiment advantageously alleviates the ring generator in the CO simulator 30 from having a powerful enough ring generator to ring all of the telephones 13 in the event that there are many telephones 13.

Furthermore, where the telephone instrument 106 does not have a ringer, e.g., a headset telephone device comprising only a speaker and microphone, the CO simulator 30 is alleviated from having a ring generator at all. This is particularly advantageous where the modem 104 is comprised within an environment allowing restricted power consumption or space. An example of such an environment is in a notebook computer. In one embodiment, the modem 104 is a PCMCIA modem, for example. Preferably, the subscriber is notified of an incoming call by the computer 102 to which the modem 104 is coupled. For example, the computer 102 may beep, simulate the sound of a telephone ringing, and/or notify the subscriber in a graphical manner on the computer screen of the incoming call.

Figure 7:
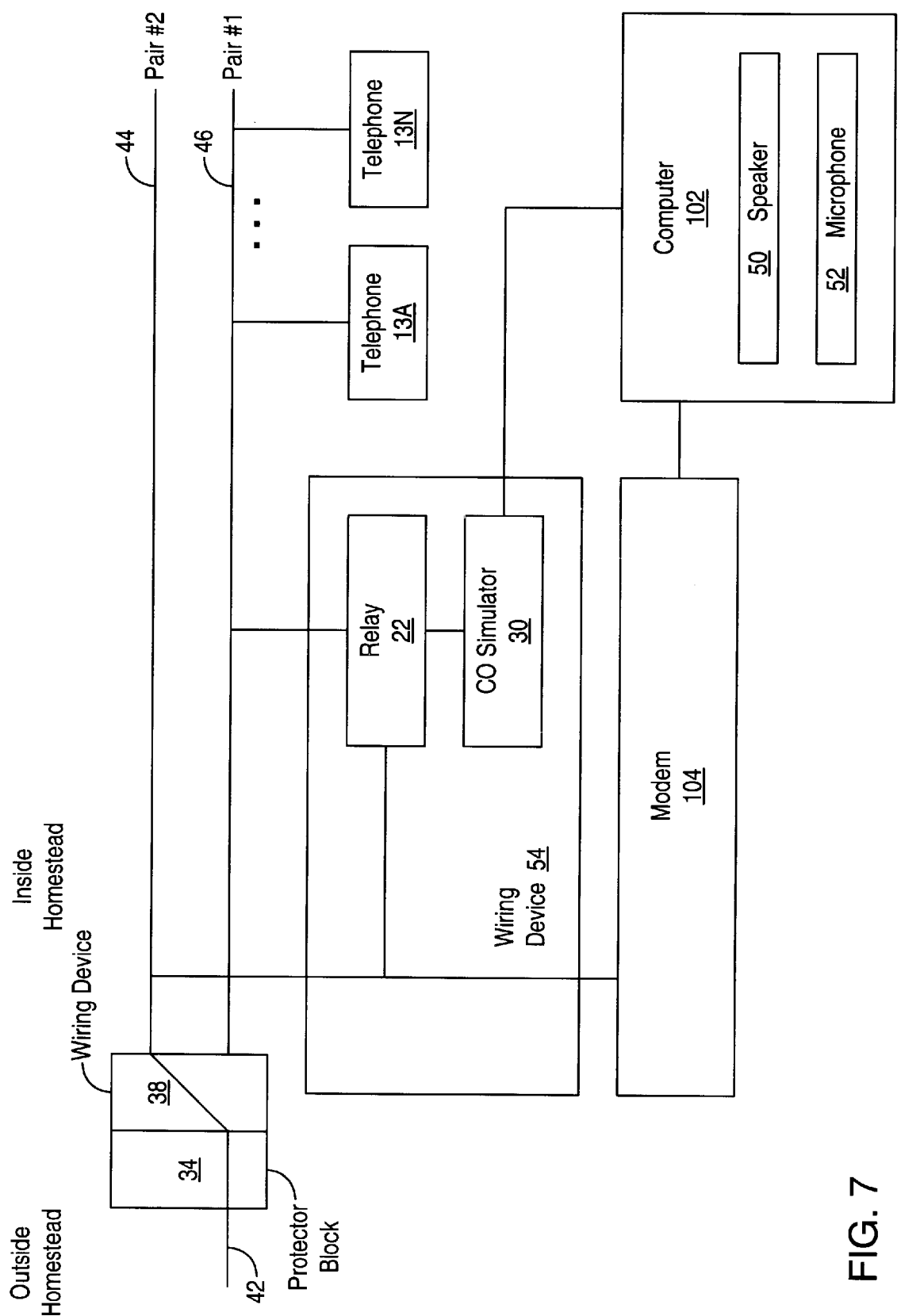
FIG. 7 is a block diagram of a telecommunications system according to an alternate embodiment of the present invention.

FIG. 7—Alternate Embodiment

Referring now to FIG. 7, a block diagram is shown of a telecommunications system including the wiring device 38 of FIG. 3 according to an alternate embodiment of the present invention. The embodiment of FIG. 7 is similar to that of FIG. 4, and corresponding circuit portions are numbered identically for simplicity and clarity. In the embodiment of FIG. 7, the relay 22 and relay control circuit 31 are comprised in a second wiring device 54, as shown. The second wiring device 54, is coupled between the modem 104 and the first and second conductor pairs 46 and 44.

Preferably, the second wiring device 54 further comprises a ring generator, included in a CO simulator 30, for ringing the telephones 13. The relay 22 is coupled between the first conductor pair 46 and the ring generator. The second wiring device 54 couples the second conductor pair 44 to the modem 104.

In this embodiment, the modem 104 may be a conventional modem as are well know in the art of modem design. In particular, the conventional modem does not necessarily comprise the CO simulator 30 and relay 22, and/or codec 28. Rather, the modem 104 is capable of performing data communications between the computer 102 and the remote data site. That is, the modem 104 is capable of receiving a data stream from the computer 102, modulating the data stream, and transmitting the modulated data stream on the telephone line 42 to the remote data site. Conversely, the modem 104 is capable of receiving a modulated data stream from the telephone line 42 and demodulating the received modulated data stream into a data stream to provide to the computer 102.

In this embodiment, the first subscriber speaks into a microphone 52 of the computer 102 and listens via a speaker 50 of the computer 102. Preferably, the microphone 52 and speaker 50 are comprised as part of a sound card or other audio device of the computer 102. The audio device receives the first subscriber's speech and transforms the speech into digital voice data. Preferably, the computer 102 transforms the digital voice data into another format, such as encoded and/or compressed voice data. The subscriber's speech may be encoded by various techniques, such as GSM encoding techniques, voice encoding techniques, etc.

The computer 102 then multiplexes the encoded voice data with other data into a data stream. The other data is the data of the data communications being performed between the computer 102 and the remote data site, such as Internet data. The multiplexed data stream is then provided to the modem 104. The modem 104 transmits the data stream to the remote data site. Preferably, the computer 102 packetizes the data stream into a stream of data packets, such as Internet Protocol (IP) packets, and provides the data packet stream to the modem 104 for modulation and transmission to the remote data site. Thus, the encoded voice is transmitted in packets, such as IP packets or other packets, to the remote data site. The communications server 122, or voice gateway 122 of FIG. 1, at the remote data site receives the stream of data packets and de-multiplexes the Internet data from the encoded voice data. The voice data is then transmitted by the communications server 122 to the second subscriber through the PSTN. The Internet data is provided to the data server 124, i.e., the Internet.

Conversely, the communications server 122 receives voice signals from the second subscriber and converts the voice signals into data. The communications server 122 also receives data from the data server 124. The communications server 122 multiplexes the voice and data into a data stream and sends the data stream to the modem 104 on the telephone line 42. The modem receives the data stream and provides it to the computer 102. The computer 102 de-multiplexes the Internet data and speech data. If the speech data is encoded, preferably, the computer processor decodes the speech. The computer 102 provides the decoded speech to the audio device which plays the speech on the computer's speaker 50.

Thus, the first subscriber performs voice communications with the second subscriber coupled to the communications server 122 through the PSTN on the telephone line 42 while performing data communications with the remote data site on the telephone line 42.

Where the remote data site is an ISP, when the subscriber dials up the ISP, an Internet connection is established between the subscriber and the ISP, such as a Point-to-Point Protocol (PPP) or Serial Line Internet Protocol (SLIP) connection. When the Internet connection is established, the ISP creates an IP address for the subscriber. When the ISP receives a telephone call directed at the subscriber but which was forwarded to the ISP, as previously described, the ISP matches the incoming call to the created IP address. The ISP then sends a signal indicating the incoming call to subscriber's computer 102. Preferably, the signal indicating the incoming call comprises data in one or more data packets, such as IP packets. The computer 102 receives the packet indicating the incoming call and notifies the subscriber of the incoming call. Preferably, the computer 102 notifies the subscriber of the incoming call visibly, such as via an icon on the computer's display screen, or audibly, such as via the speaker 50.

Furthermore, when the computer 102 receives the packet indicating the incoming call, the computer 102 controls the ringer in the wiring device 54 to generate a ringing voltage to ring the telephone extensions 13. Thus, the subscriber may advantageously be notified of the incoming call in the event that the subscriber is not situated so as to detect the notification of the incoming call from the computer 102, such as the visual or audible notification. That is, rather than the modem 104 detecting the data packet indicating the incoming call and in response controlling the ring generator, as in the embodiment of FIG. 4, in the embodiment of FIG. 7, the computer 102 detects the data packet indicating the incoming call and in response controls the ring generator to ring the extensions 13.

Various means are contemplated for the computer 102 to control the ring generator to ring the telephones 13. Exemplary means are recited here for illustration purposes, although other means may be apparent to one skilled in the art. The computer 102 may control the ring generator by means of an interface, such as a serial, parallel, Universal Serial Bus (USB), IEEE 1394 or other such interface coupled between the computer 102 and the wiring device 54, as shown. Furthermore, the computer 102 may control the ring generator through the modem 104. Furthermore, the computer 102 may include an expansion card which couples to an expansion slot in the computer 102, wherein the expansion card interfaces to the ring generator to control the ring generator in response to being programmed by the computer 102. Preferably, the various operations described which are performed by the computer 102 are performed, at least in part, by software executing on the computer 102.

In one embodiment, the remote data site provides information to the subscriber's computer 102 which identifies the caller of the incoming call. When the computer 102 provides the subscriber with the indication of the incoming call, the computer 102 also identifies the caller who placed the incoming call, such as on the computer's display screen or audibly via the speaker 50. Thus, the subscriber may advantageously selectively answer the call.

Conclusion

Therefore, a system is shown which enables a subscriber to receive incoming telephone calls on a telephone line and ring all of the telephones connected to a first conductor pair inside the subscriber's premises, wherein the first conductor pair would have normally been connected to the line. The telephones may be rung even when the subscriber is performing data communications with a remote data site on the telephone line. This obviates the necessity of the subscriber having to purchase a second telephone line for incoming calls while data communications are being performed, thus reducing access costs. The system and method shown advantageously employs a wiring device to reroute the telephone line from the first conductor pair, which is connected to the telephones, to a second conductor pair, which is normally only used to connect to a second telephone line if purchased. The system and method further employs a modem which receives telephone signals from the telephone line via the second conductor pair. The modem comprises a Central Office simulator circuit coupled to the first conductor pair which regenerates the telephone signals, such as a ringing signal, to the telephones via the first conductor pair in response to an indication of an incoming call on the second conductor pair.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A telecommunications system, comprising:

a telephone line for transferring signals between a telephone network and a premises;

first and second conductor pairs for transferring signals within the premises;

a wiring device coupled between said telephone line and said second conductor pair, wherein said wiring device is configured to connect said telephone line to said second conductor pair;

one or more telephone instruments coupled to said first conductor pair;

a ring generator;

a modem coupled to said second conductor pair and said ring generator;

a relay configured to (a) couple the first conductor pair to said ring generator in a first state of said modem and (b) to electrically connect the first conductor pair to said second conductor pair in a second state of said modem so that a ringing voltage generated by the telephone network can be conveyed from the second conductor pair to the first conductor pair in order to ring the one or more telephone instruments;

wherein the ring generator is operable to ring said one or more telephone instruments when said relay couples the first conductor pair to the ring generator, wherein said modem is operable to receive signals indicating an incoming call, wherein said signals indicating an incoming call are received from said second conductor pair transferred on said telephone line, wherein said modem includes control circuitry operable, in said first state, to control said ring generator to ring said one or more telephone instruments in response to said signals indicating an incoming call.

2. The system of claim 1, wherein said modem further comprises communications circuitry operable, in said first state, to perform data communications with a remote data site through the telephone network, wherein the communications circuitry performs said data communications through said second conductor pair coupled to said telephone line by said wiring device, wherein said control circuitry is operable to control said ring generator to ring said one or more telephone instruments in response to said signals indicating an incoming call received from said second conductor pair while said modem is performing said data communications with the remote data site.

3. The system of claim 2, wherein said signals indicating an incoming call received from said second conductor pair comprise one or more data frames, wherein said one or more data frames comprise data indicating an incoming call.

4. The system of claim 2, wherein said signals indicating an incoming call received from said second conductor pair comprise one or more Internet Protocol data packets, wherein said one or more Internet data packets comprise data indicating an incoming call.

5. The system of claim 2, wherein, in said first state, said modem is operable to route voice communications between said one or more telephone instruments coupled to said first conductor pair and an external subscriber, wherein said external subscriber is coupled through the telephone network, said telephone line and said second conductor pair, wherein said modem is operable to route said voice communications while simultaneously performing said data communications.

6. The system of claim 2, further comprising a computer coupled to said modem, wherein said modem is operable to perform said data communications between said computer and said remote data site through the telephone network.

7. The system of claim 1, wherein said ring generator is comprised within said modem.

8. The system of claim 7, further comprising a first telephone instrument coupled to said ring generator through said relay in said first state, wherein said ring generator is operable to ring said first telephone instrument in response to said signals indicating an incoming call received from said second conductor pair transferred on said telephone line.

9. The system of claim 1, wherein said first state comprises an off-hook condition generated by said modem on said second conductor pair.

10. The system of claim 9, wherein said second state comprises an on-hook condition generated by said modem on said second conductor pair.

11. The system of claim 1, wherein said relay is comprised within said modem.

12. The system of claim 9, wherein said relay is comprised within a second wiring device coupled between said modem and said first and second conductor pairs, wherein said second wiring device is configured to couple said second conductor pair to said control circuitry to enable said control circuitry to receive said signals indicating an incoming call.

13. The system of claim 12, wherein said ring generator is comprised within said modem, wherein said second wiring device further comprises a ring booster circuit for ringing said one or more telephone instruments, wherein said ring booster circuit is coupled between said ring generator and said relay.

14. The system of claim 1, wherein said ring generator is comprised within a second wiring device coupled between said modem and said first and second conductor pairs, wherein said second wiring device is configured to couple said second conductor pair to said control circuitry to enable said control circuitry to receive said signals indicating an incoming call.

15. The system of claim 1, further comprising a computer coupled to said modem, wherein said computer is operable to provide an indication of said incoming telephone call to a user of said computer in response to said signals indicating said incoming call received from said modem.

16. The system of claim 1, wherein the relay is configured to couple the first conductor pair to the ring generator as long as the modem is generating an off-hook condition on the second conductor pair, and wherein the relay is further configured to electrically connect the first conductor pair to the second conductor pair as long as the modem is generating an on-hook condition on the second conductor pair.

17. A telecommunications system, comprising:

a first conductor pair and a second conductor pair;

a protector block coupled to a telephone line;

a modular wiring device coupled between said protector block and said first and second conductor pairs, wherein the modular wiring device comprises a first modular telephone connector configured to be coupled to said protector block and a second modular telephone connector configured to be coupled to said second conductor pair, and wherein said modular wiring device is configured to connect said telephone line to said second conductor pair;

a ring generator coupled to said first conductor pair for ringing one or more telephone instruments coupled to said first conductor pair; and a modem coupled to said second conductor pair and said ring generator, wherein said modem is operable to receive signals indicating an incoming call from a telephone network, wherein said signals indicating an incoming call are received from said second conductor pair transferred on said telephone line, wherein said modem includes control circuitry operable to control said ring generator to ring said one or more telephone instruments in response to said signals indicating an incoming call.

18. The system of claim 17, wherein said modem further comprises communications circuitry for performing data communications with a remote data site through the telephone network, wherein the communications circuitry performs data communications through said second conductor pair coupled to said telephone line by said wiring device, wherein said control circuitry is operable to control said ring generator to ring said one or more telephone instruments in response to said signals indicating an incoming call received from said second conductor pair while said modem is performing data communications with the remote data site.

19. The system of claim 18, wherein said signals indicating an incoming call received from said second conductor pair comprise one or more Internet Protocol data packets, wherein said one or more Internet data packets comprise data indicating an incoming call.

20. The system of claim 18, wherein said modem is operable to route voice communications between said one or more telephone instruments coupled to said first conductor pair and an external subscriber, wherein said external subscriber is coupled through the telephone network, said telephone line and said second conductor pair, wherein said modem is operable to route said voice communications while simultaneously performing said data communications.

21. The system of claim 18, further comprising a computer coupled to said modem, wherein said modem is operable to perform data communications between said computer and a remote data site through the telephone network.

22. The system of claim 18, wherein said signals indicating an incoming call received from said second conductor pair comprise one or more data frames, wherein said one or more data frames comprise data indicating an incoming call.

23. The system of claim 17, wherein the first modular telephone connector comprises a first four-wire port coupled to the protector block; and wherein the second modular telephone connector comprises a second four-wire port coupled to the first conductor pair and the second conductor pair, wherein the modular wiring device is configured to couple red and green wire-positions of the first four-wire port to black and yellow wire-positions respectively of the second four-wire port.

24. The system of claim 17, further comprising a relay for selectively coupling said first conductor pair to either said second conductor pair or said ring generator;

wherein when said relay couples said first conductor pair to said second conductor pair, said relay is operable to convey a ringing voltage generated by the telephone network from said second conductor pair to said first conductor pair to ring said one or more telephone instruments.

25. The system of claim 24, wherein said relay is operable to couple said first conductor pair to said ring generator in response to said modem generating an off hook condition on said second conductor pair; and wherein said relay is operable to couple said first conductor pair to said second conductor pair in response to said modem generating an on hook condition on said second conductor pair.

26. The system of claim 24, wherein said relay is comprised within said modem.

27. The system of claim 24, wherein said relay is comprised within a second wiring device coupled between said modem and said first and second conductor pairs, wherein said second wiring device is configured to couple said second conductor pair to said control circuitry to enable said control circuitry to receive said signals indicating an incoming call.

28. The system of claim 27, wherein said ring generator is comprised within said modem, wherein said second wiring device further comprises a ring booster circuit for ringing said one or more telephone instruments, wherein said ring booster circuit is coupled between said ring generator and said relay.

29. The system of claim 17, wherein said ring generator is comprised within a second wiring device coupled between said modem and said first and second conductor pairs, wherein said second wiring device is configured to couple said second conductor pair to said control circuitry to enable said control circuitry to receive said signals indicating an incoming call.

30. The system of claim 17, further comprising a computer coupled to said modem, wherein said computer is operable to provide an indication of an incoming telephone call upon said telephone line in response to said signals indicating an incoming call received from said modem.

31. The system of claim 17, wherein said ring generator is comprised within said modem.

32. The system of claim 31, further comprising a first telephone instrument coupled to said ring generator comprised within said modem, wherein said ring generator is operable to ring said first telephone instrument in response to said signals indicating an incoming call received from said second conductor pair transferred on said telephone line.

33. A telecommunications system, comprising:
a wiring device coupled between a telephone line and a second of first and second conductor pairs, wherein said wiring device is configured to connect said telephone line to said second conductor pair;
a ring generator;
control circuitry coupled to said second conductor pair and said ring generator;
a relay configured to couple the first conductor pair to (a) said ring generator in a first state and (b) said second conductor pair in a second state, wherein the ring generator is operable to ring one or more telephone instruments coupled to said first conductor pair when said relay couples the first conductor pair to the ring generator, and wherein when said relay electrically connects the first conductor pair to the second conductor pair said relay is operable to convey a ringing voltage transmitted on the telephone line to the first conductor pair in order to ring the one or more telephone instruments;
wherein said control circuitry is operable to receive signals indicating an incoming call from a telephone network, wherein said signals indicating an incoming call are received from said second conductor pair transferred on said telephone line, wherein said control circuitry is operable, in said first state, to control said ring generator to ring said one or more telephone instruments in response to said signals indicating an incoming call.

34. The system of claim 33, further comprising communications circuitry for performing data communications with a remote data site though the telephone network, wherein the communications circuitry performs data communications through said second conductor pair coupled to said telephone line by said wiring device, wherein said control circuitry is operable to control said ring generator to ring said one or more telephone instruments in response to said signals indicating an incoming call received from said second conductor pair while said control circuitry is performing data communications with the remote data site.

35. The system of claim 34, wherein, in said first state, said communications circuitry is operable to route voice communications between said one or more telephone instruments coupled to said first conductor pair and an external subscriber, wherein said external subscriber is coupled through the telephone network, said telephone line and said second conductor pair, wherein said communications circuitry is operable to route said voice communications while simultaneously performing said data communications.

36. The system of claim 35, wherein said control circuitry is comprised within a computer, wherein said communications circuitry is operable to perform said data communications between said computer and said remote data site through the telephone network.

37. The system of claim 36, wherein said computer comprises a speaker and microphone for enabling a user of said computer to perform said voice communications with the external subscriber over the telephone line while simultaneously performing said data communications.

38. The system of claim 34, wherein said signals indicating an incoming call received from said second conductor pair comprise one or more data frames, wherein said one or more data frames comprise data indicating an incoming call.

39. The system of claim 34, wherein said signals indicating an incoming call received from said second conductor pair comprise one or more Internet Protocol data packets, wherein said one or more Internet data packets comprise data indicating an incoming call.

40. The system of claim 33, wherein said relay is comprised within a second wiring device coupled between said control circuitry and said first and second conductor pairs, wherein said second wiring device is configured to couple said second conductor pair to said control circuitry to enable said control circuitry to receive said signals indicating said incoming call.

41. The system of claim 33, wherein said ring generator is comprised within a second wiring device coupled between said control circuitry and said first and second conductor pairs, wherein said second wiring device is configured to couple said second conductor pair to said control circuitry to enable said control circuitry to receive said signals indicating said incoming call.

42. The system of claim 33, wherein said first state comprises an off-hook condition on said second conductor pair.

43. The system of claim 42, wherein said second state condition comprises an on-hook condition on said second conductor pair.

44. The system of claim 33, wherein the first state occurs as long as the modem generates an off-hook condition on the second conductor pair and the second state occurs as long as the modem generates an on-hook condition on the second conductor pair.

45. A method for performing telecommunications in a system including a telephone line connected to a protector block at a premises, wherein said system further includes first and second conductor pairs residing within the premises, wherein said system further includes one or more telephone instruments coupled to said first conductor pair, wherein the system further comprises a ring generator for ringing the one or more telephone instruments, the method comprising:

coupling a modular wiring device comprising at least two modular telephone connectors between the protector block and the first conductor pair and the second conductor pair, wherein said coupling comprises coupling a first modular telephone connector to said protector block and coupling a second modular telephone connector to said second conductor pair, wherein the modular wiring device couples the telephone line to the second conductor pair;

receiving signals on the second conductor pair received from the telephone line, wherein said signals indicate an incoming call on the telephone line;

controlling said ring generator to ring the one or more telephone instruments in response to the received signals indicating said incoming call on the telephone line.

46. The method of claim 45, further comprising:
coupling the ring generator to the first conductor pair prior to said receiving signals.

47. The method of claim 46, further comprising:
generating an off hook condition on the second conductor pair prior to said receiving signals;
wherein said coupling the ring generator to the first conductor pair is performed in response to said generating said off hook condition.

48. The method of claim 45, wherein said ring generator rings the one or more telephone instruments by generating a ringing voltage on the first conductor pair.

49. The method of claim 45, further comprising performing data communications with a remote data site through a telephone network, said telephone line and said second conductor pair, wherein said controlling said ring generator to ring the one or more telephone instruments in response to the received signals indicating said incoming call on the telephone line is performed during said performing data communications with the remote data site.

50. The method of claim 45, further comprising performing voice communications between the one or more telephone instruments and an external subscriber through a telephone network coupled to the telephone line on the second conductor pair while simultaneously performing data communications with a remote data site through the telephone network on the telephone line coupled to the second conductor pair.

51. The method of claim 45, further comprising:
generating an on hook condition on the second conductor pair after said controlling said ring generator to ring the one or more telephone instruments;
a relay coupling said first conductor pair to said second conductor pair in response to said generating said on hook condition.

52. The method of claim 51, further comprising:
receiving a ringing voltage through said second conductor pair from a telephone network coupled to the telephone line;
said relay transmitting the ringing voltage from said second conductor pair to the first conductor pair;
wherein said one or more telephone instruments ring in response to said ringing voltage transmitted to said first conductor pair.

53. A method for ringing a plurality of extensions on a premises, wherein the premises is operable to couple to a telephone line provided to the premises, wherein the premises includes first and second conductor pairs residing within the premises, wherein the telephone line is coupled to the second conductor pair, wherein one or more telephone instruments are coupled to the first conductor pair, the method comprising:

a modem generating an off-hook condition on the second conductor pair and connecting to a remote data site using the telephone line;

said modem performing data communications with the remote data site on the telephone line, wherein the data communications are transferred over the second conductor pair and the telephone line;

a relay coupling the first conductor pair to a ring generator in response to the modem generating the off-hook condition on the second conductor pair, and electrically connecting the first conductor pair to the second conductor pair in response to the modem generating an on-hook condition on the second conductor pair;

receiving signals indicating an incoming call, wherein said signals indicating an incoming call are received on the second conductor pair from the telephone line, wherein said receiving signals indicating an incoming call occurs during said performing data communications with the remote data site on the telephone line;

controlling the ring generator to ring the one or more telephone instruments in response to the received signals indicating an incoming call;

receiving a ringing voltage on the second conductor pair from the telephone line during a time when the modem is generating the on-hook condition on the second conductor pair; and the relay conveying the ringing voltage from the second conductor pair to the first conductor pair to ring the one or more telephone instruments.

54. The method of claim 53, further comprising:
disconnecting from the remote data site;
generating said on-hook condition on the second conductor pair after said controlling the ring generator to ring the one or more telephone instruments;
said relay coupling said first conductor pair to said second conductor pair in response to said generating said on hook condition.

55. The method of claim 54, further comprising:
receiving a ringing voltage through said second conductor pair from a telephone network coupled to the telephone line after said relay couples said first conductor pair to said second conductor pair;
said relay transmitting the ringing voltage from said second conductor pair to the first conductor pair;
wherein said one or more telephone instruments ring in response to said ringing voltage transmitted to said first conductor pair.

56. A method for performing telecommunications in a system including a telephone line provided to a premises, wherein the system further includes first and second conductor pairs residing within the premises, one or more telephone instruments coupled to the first conductor pair, and a ring generator for ringing the one or more telephone instruments, the method comprising:

coupling the telephone line to the second conductor pair;
in a first mode:
receiving signals on the second conductor pair from the telephone line, wherein said signals indicate an incoming call on the telephone line; and controlling said ring generator to ring the one or more telephone instruments in response to the received signals indicating said incoming call on the telephone line;

in a second mode:

receiving a ringing voltage on the second conductor pair transmitted from a telephone network through the telephone line and the second conductor pair; and passing the ringing voltage from the second conductor pair to the first conductor pair to ring the one or more telephone instruments.

57. A telecommunications system, comprising:

a first conductor pair and a second conductor pair;

a telephone line connected to said first conductor pair;

a ring generator coupled to said second conductor pair for ringing a plurality of telephone instruments coupled to said second conductor pair;

a modem coupled to said first conductor pair and said ring generator, wherein said modem is operable to receive signals indicating an incoming call from a telephone network, wherein said signals indicating an incoming call are received from said first conductor pair transferred on said telephone line, wherein said modem includes control circuitry operable to control said ring generator to ring said one or more telephone instruments in response to said signals indicating an incoming call; and a plurality of modular wiring devices, one for each of the telephone instruments, wherein each modular wiring device is configured to be placed at a telephone jack for its corresponding telephone instrument to switch the conductor pair to which the telephone instrument is coupled so that each of the telephone instruments are coupled to the second conductor pair and not the first conductor pair.

* * * * *